(12) United States Patent
Park et al.

(10) Patent No.: US 10,748,000 B2
(45) Date of Patent: Aug. 18, 2020

(54) METHOD, ELECTRONIC DEVICE, AND RECORDING MEDIUM FOR NOTIFYING OF SURROUNDING SITUATION INFORMATION

(71) Applicant: Samsung Electronics Co., Ltd., Suwon-si, Gyeonggi-do (KR)

(72) Inventors: An-Na Park, Suwon-si (KR); Byung-Jun Son, Seoul (KR); Moon-Il Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 15/548,606

(22) PCT Filed: Feb. 2, 2016

(86) PCT No.: PCT/KR2016/001131
§ 371 (c)(1),
(2) Date: Aug. 3, 2017

(87) PCT Pub. No.: WO2016/126083
PCT Pub. Date: Aug. 11, 2016

(65) Prior Publication Data
US 2018/0012073 A1 Jan. 11, 2018

(30) Foreign Application Priority Data
Feb. 6, 2015 (KR) .................. 10-2015-0018708

(51) Int. Cl.
*G06K 9/00* (2006.01)
*H04N 5/232* (2006.01)
(Continued)

(52) U.S. Cl.
CPC ..... *G06K 9/00671* (2013.01); *G06K 9/00335* (2013.01); *G06Q 50/10* (2013.01);
(Continued)

(58) Field of Classification Search
None
See application file for complete search history.

(56) References Cited

U.S. PATENT DOCUMENTS 7,542,834 B2 * 6/2009 Nobori ...................... B60R 1/00
340/435
8,064,759 B1 * 11/2011 Kahn ................. H04N 5/23293
396/50
(Continued)

FOREIGN PATENT DOCUMENTS

JP 2005-266014 A 9/2005
KR 10-0405636 B1 11/2003
(Continued)

*Primary Examiner* — Christopher Braniff
(74) *Attorney, Agent, or Firm* — Jefferson IP Law, LLP

(57) ABSTRACT

According to various embodiments, a method for notifying of surrounding situation information by an electronic device may comprise the operations of: monitoring a value indicating a movement of the electronic device; determining whether a state of the electronic device is a stopped state, on the basis of the value indicating a movement of the electronic device; and acquiring surrounding situation information of the electronic device, which will be notified of to a user, when the state of the electronic device is a stopped state; and outputting the surrounding situation information.

16 Claims, 15 Drawing Sheets

(51) Int. Cl.
    *G06Q 50/10*      (2012.01)
    *G06Q 99/00*      (2006.01)
    *G10L 13/04*      (2013.01)

(52) U.S. Cl.
    CPC ............ *G06Q 99/00* (2013.01); *G10L 13/043*
        (2013.01); *H04N 5/23293* (2013.01); *H04N*
        *5/232939* (2018.08)

(56) References Cited

U.S. PATENT DOCUMENTS

| | | | |
|---|---|---|---|
| 2005/0018049 A1* | 1/2005 | Falk | H04N 5/232 |
| | | | 348/207.99 |
| 2007/0003686 A1 | 1/2007 | Fichtali et al. | |
| 2010/0309335 A1* | 12/2010 | Brunner | H04N 5/144 |
| | | | 348/231.6 |
| 2012/0075345 A1* | 3/2012 | Lee | G06F 17/30247 |
| | | | 345/633 |
| 2012/0223966 A1 | 9/2012 | Lim | |

FOREIGN PATENT DOCUMENTS

| | | | |
|---|---|---|---|
| KR | 10-2008-0031045 A | | 4/2008 |
| KR | 10-2009-0105531 A | | 10/2009 |
| KR | 20090105531 | * | 10/2009 |
| KR | 10-0957575 B1 | | 5/2010 |
| KR | 10-2010-0114819 A | | 10/2010 |
| KR | 10-2012-0062165 A | | 6/2012 |
| KR | 10-2012-0074669 A | | 7/2012 |
| KR | 10-2012-0088320 A | | 8/2012 |
| KR | 10-2014-0139319 A | | 12/2014 |

\* cited by examiner

METHOD, ELECTRONIC DEVICE, AND RECORDING MEDIUM FOR NOTIFYING OF SURROUNDING SITUATION INFORMATION

CROSS-REFERENCE TO RELATED APPLICATION

This application is a U.S. National Stage application under 35 U.S.C. 371§ of an International application filed on Feb. 2, 2016 and assigned application number PCT/KR2016/001131, which claimed the benefit of a Korean patent application filed on Feb. 6, 2015 in the Korean Intellectual Property Office and assigned Serial number 10-2015-0018708, the entire disclosure of which is hereby incorporated by reference.

TECHNICAL FIELD

Various embodiments relate to an electronic device and a method for notifying of surrounding situation information.

BACKGROUND ART

Conventionally, a technique for recognizing an object photographed by a camera and displaying object-related information is disclosed.

For example, when looking at players on a baseball field, information on each player can be displayed, or it is possible to display information on ruins in historic sites, etc.

In addition, the prior art discloses a technique for recognizing a text in a document photographed by the camera, and converting the recognized text to voice and then outputting the voice.

DETAILED DESCRIPTION OF THE INVENTION

Technical Problem

The prior art has a disadvantage that may not provide image information at a user's desired time point.

The prior art has a limitation in providing useful information desired by the user.

Technical Solution

According to various embodiments, a method for notifying of surrounding situation information by an electronic device is provided. The method may include: monitoring a value indicating a movement of the electronic device; determining whether the electronic device is in a stationary state based on the value indicating the movement of the electronic device; when the state of the electronic device is in the stationary state, acquiring information on the surrounding situation information of the electronic device to be notified to a user; and outputting the surrounding situation information.

According to various embodiments of the present disclosure, there is provided an electronic device. The electronic device may include: a camera; and a controller configured to monitor a value indicating a movement of the electronic device, determine whether the electronic device is in a stationary state based on the value indicating the movement of the electronic device, acquire information on the surrounding situation information of the electronic device to be notified of to a user when the state of the electronic device is in the stationary state, and output the surrounding situation information.

Effect of Invention

In various embodiments, the movement of the electronic device is detected so as to figure out the time point at which the user wishes to know the surrounding situation information, and information on a preview image of the camera is analyzed and informed of to the user, so as to provide a convenience.

In various embodiments, visually-impaired persons are able to recognize information included in a preview image of the camera and receive surrounding situation information, and thus accessibility can be greatly improved. In addition, individuals with poor vision who are partially sighted or blurry sighted as well as totally blind or even weak-sighted individuals can be provided with surrounding situation information by analysis thereof in real time through the preview image.

In various embodiments, even general users can be provided with a desired background recommendation guide when photographing a picture, based on a result of recognizing the preview images, thus increasing the user's convenience.

MODE FOR INVENTION

Figure 1:
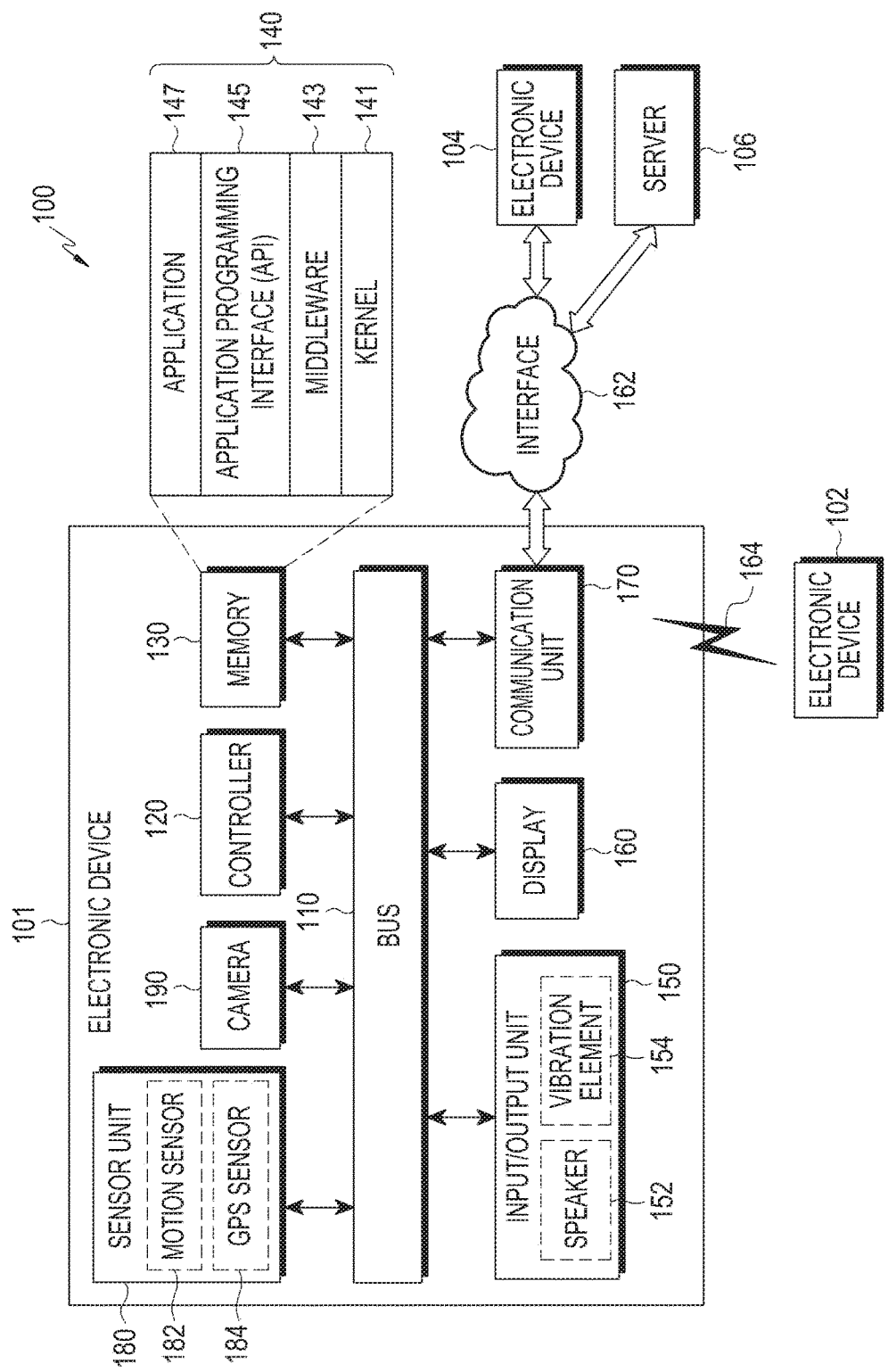
FIG. 1 illustrates a network environment including an electronic device, according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

Throughout the specification, the words "have," "may have," "include," "may include," and the like indicate existence of the corresponding feature (e.g., a numerical value, a function, an operation, or an element such as a component, etc.) and does not exclude the existence of the additional feature.

Throughout the specification, the expressions "A or B," "at least one of A or/and B," "one or more of A or/and B," and the like may include all combinations of the listed items. For example, "A or B," "at least one of A and B," or "at least one of A or B" may refer to all cases of (1) including at least one A, (2) including at least one B, or (3) including both at least one A and at least one B.

The expressions "a first," "a second," "the first," "the second," and the like, used in various embodiments, may modify various elements irrespective of order and/or importance thereof and do not limit the corresponding elements. The above-described expressions may be used to distinguish an element from another element. For example, a first user device and a second user device may indicate different user devices irrespective of order or importance. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured (or set) to", used in this specification, may be interchangeably used with, for example, "suitable for," "having the capacity to," "designed to," "adapted to," "made to," or "capable of" according to circumstances. The term "configured (or set) to" may not necessarily mean "specifically designed to" in hardware. Instead, in some cases, the expression "device configured to" may mean that the device "can ~" together with other devices or components. For example, the text "processor configured (or set) to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Terms used in this specification are merely used to describe a specific embodiment and may not be intended to limit the scope of another element. Singular forms may include plural forms unless the context clearly indicates otherwise. Unless defined otherwise, all terms used herein, including technical and scientific terms, have the same meaning as those commonly understood by a person skilled in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, terms defined in this specification may not be interpreted as excluding embodiments of the present disclosure.

Electronic devices, according to various embodiments of the present disclosure, may include, for example, at least one of a smart phone, a tablet Personal Computer (PC), a mobile phone, a video phone, an e-book reader, a desktop Personal Computer (PC), a laptop Personal Computer (PC), a netbook computer, a workstation, a server, a Personal Digital Assistant (PDA), a Portable Multimedia Player (PMP), an MP3 player, a mobile medical appliance, a camera, and a wearable device (e.g., smart glasses, a Head-Mounted Device (HMD), electronic clothing, an electronic bracelet, an electronic necklace, an electronic appcessory, electronic tattoos, a smart mirror, or a smart watch).

In some embodiments, an electronic device may be a smart home appliance. The smart home appliance may include, for example, at least one of a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic photo frame.

In another embodiment, an electronic device may include at least one of various types of medical devices (e.g., various types of portable medical measurement devices (a blood-glucose measuring meter, a heart-rate measuring meter, a blood-pressure measuring meter, a body-temperature measuring meter, and the like), a Magnetic Resonance Angiography (MRA), a Magnetic Resonance Imaging (MRI), a Computed Tomography (CT), a scanning machine, an ultrasonic machine, and the like), a navigation device, a Global Positioning System (GPS) receiver, an Event Data Recorder (EDR), a Flight Data Recorder (FDR), a vehicle infotainment device, electronic equipment for a vessel (e.g., a vessel navigation device, a gyro compass, and the like), avionics, a security device, a head unit for a vehicle, an industrial or home robot, an Automatic Teller's Machine (ATM) of a financial institution, a Point of Sales (POS) of a store, and Internet of Things (e.g., a light bulb, various types of sensors, an electric or gas meter, a sprinkler device, a fire alarm, a thermostat, a streetlamp, a toaster, exercise equipment, a hot-water tank, a heater, a boiler, etc.).

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, an electronic device may be a combination of one or more of the aforementioned various devices. An electronic device, according to an embodiment, may be a flexible electronic device. Further, an electronic device, according to an embodiment of the present disclosure, is not limited to the aforementioned devices and may include a new electronic device according to technological advance.

Hereinafter, electronic devices, according to various embodiments of the present disclosure, will be described with reference to the accompanying drawings. The term "user" used in this specification may refer to a person or a device (e.g., an artificial intelligence electronic device) that uses an electronic device.

FIG. 1 illustrates a network environment including an electronic device, according to various embodiments.

Referring to FIG. 1, an electronic device 101 within a network environment 100 according to various embodiments is disclosed. The electronic device 101 may include a bus 110, a controller 120, a memory 130, an input/output unit 150, a display 160, and a communication unit 170, a sensor unit 180, and a camera 190. In an embodiment, the electronic device 101 may omit at least one of the above elements, or may additionally include other elements.

The bus 110 may connect, for example, the elements 120, 130, 150 to 190 with each other, and include a circuit that transmits communication (for example, a control message and/or data) between the elements.

The controller 120 may include one or more of a Central Processing Unit (CPU), an Application Processor (AP), and a Communication Processor (CP). For example, the controller 120 may execute operations or data processing related to control and/or communication of at least one other element of the electronic device 101. The controller 120 may be referred to as a processor, include the processor as a part of the controller, or configure the processor.

The memory 130 may include a volatile memory and/or a non-volatile memory. The memory 130 may store, for example, commands or data related to at least one other element of the electronic device 101. According to an embodiment, the memory 130 may store software and/or a program 140. The program 140 may include, for example, a kernel 141, middleware 143, an Application Programming Interface (API) 145, and/or an application program 147 (or an application), etc. At least a part of the kernel 141, the middleware 143, or the API 145 may be referred to as an operation system (OS).

The kernel 141 may control or manage system resources (e.g., the bus 110, the controller 120 or the memory 130, etc.) used to perform an operation or a function implemented in other programs (for example, the middleware 143, the API 145 or the application program 147). In addition, the kernel 141 may provide an interface by which the middleware 143, the API 145, or the application program 147 may access the individual elements of the electronic device 101 to control or manage system resources.

The middleware 143 may, for example, serve as an intermediary that allows the API 145 or the application program 147 to communicate with the kernel 141 to transmit/receive data. In addition, the middleware 143 may, in regard to task requests received from the application program 147, perform a control (e.g., scheduling or load balancing) for the task requests, using such a method as allocating a priority to use the system resources (e.g., the bus 110, the controller 120, or the memory 130) of the electronic device 101 to at least one application of the application program 147.

The API 145 is, for example, an interface by which the applications 147 control functions provided from the kernel 141 or the middleware 143, and may include, for example, at least one interface or a function (e.g., a command) for file control, window control, image processing, or text control.

The input/output interface 150 may, for example, serve as an interface that can transfer commands or data input from a user or another external device to the other element(s) of the electronic device 101. In addition, the input/output interface 150 may output commands or data received from the other element(s) of the electronic device 101 to the user or the other external device.

The input/output unit 150 may include, for example, a speaker 152, a vibration device 154, a plurality of buttons, a microphone, a connector, a keypad, a mouse, a trackball), a joystick, cursor direction keys, or cursor control, or the like.

The speaker 152 may output a sound corresponding to various signals (for example, a radio signal, a broadcast signal, digital audio files, digital video files or photo shooting, and so on) based on the control of the controller 120 to the outside of the electronic device 101. The speaker 152 may output a sound corresponding to a function performed by the electronic device 101. One or multiple speakers 152 may be formed on a suitable position or positions of the electronic device 101.

The vibration device 154 may convert an electrical signal to a mechanical vibration based on the control of the controller 120. For example, when the electronic device 101 in a vibration mode receives a voice call from another electronic device (not shown), the vibration device 154 may be operated. One or multiple vibration devices 154 may be formed in the electronic device 101. The vibration device 154 may operate in response to a user's touch operation of touching the display 160 and a continuous movement of the touch on the display 160.

The button may be formed on a front surface, a side surface, and/or a rear surface of the electronic device 101, and may include a power/lock button, a volume button, a menu button, a home button, a back button, a search button, and the like. The button may output a signal corresponding to push or push-off by the user to the controller 120.

The microphone may receive a voice or sound so as to generate an electrical signal, and output the electrical signal to the controller 120.

The connector may be used as an interface by which the electronic device 101 is connected to the server, an external electronic device, or a power source. Data stored in the memory 130 of the electronic device 101 may be transmitted to or received from an external device through a wired cable connected to the connector under the control of the controller 120. Power can be input from the power source through a wired cable connected to the connector, or a battery can be charged therefrom.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. For example, the display 160 may display various types of contents (such as text, images, video, icons, symbols or the like) under the control of the controller 120. The display 160 may include a touch screen, and may receive, for example, a touch, gesture, proximity, or hovering input by using an electronic pen or a part of the user's body.

The communication interface 170 may establish, for example, communication between the electronic device 101 and the external device (e.g., a first external electronic device 102, a second external electronic device 104, or a server 106). For example, the communication unit 170 may be connected to a network 162 through wireless communication or wired communication so as to communicate with the external device (e.g., the second external electronic device 104, or the server 106). The communication unit 170 may include a communication processor (CP), and the communication processor may be included in one module of a plurality of modules configuring the communication unit 170. In an embodiment, the communication processor may be included in the controller 120.

The wireless communication may use, as a cellular communication protocol, for example, at least one of Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), and Global System for Mobile Communications (GSM). The wired communication may include, for example, at least one of a Universal Serial Bus (USB), a High Definition Multimedia Interface (HDMI), Recommended Standard 232 (RS-232), and a Plain Old Telephone Service (POTS). The network 162 may include, as a telecommunication network, for example, at least one of a computer network (such as LAN or WAN), the Internet, a telephone network, IP Multimedia Core Network Subsystem (IMS), a Packet Data Network (PDN), 3rd Generation Partnership Project (3GPP)/3rd Generation Partnership Project 2 (3GPP2), and a core network.

The sensor unit 180 may include at least one sensor for detecting the status of the electronic device 101. For example, the sensor unit 180 may include at least one of a motion sensor 182 (for example, an acceleration sensor) for detecting a movement of the electronic device 101 (e.g., rotation, acceleration, or vibration of the electronic device 101), a GPS sensor 184, a proximity sensor for detecting whether the user accesses the electronic device 101, an illuminance sensor for detecting an amount of light in the surrounding environment of the electronic device 101, a geo-magnetic sensor for detecting a point of the compass of the electronic device 101, a gravity sensor for detecting the direction in which the gravitational force is acting an altimeter for measuring an atmospheric pressure so as to detect an altitude, and the like.

The GPS module 184 may receive radio waves from a plurality of GPS satellites (not shown) in Earth's orbit and calculate the position of the electronic device 101 using the radio waves' Time of Arrival from the GPS satellites to the electronic device 101.

The camera unit 190 may photograph still images or videos under a control of the controller 120.

The camera 190 may include a lens system, an image sensor, etc. The camera 190 may convert an optical signal input (or photographed) through the lens system into an electrical image signal (or digital images) and then output the signal to the controller 120, and the user may photograph videos or still images through the camera 190.

In addition, the camera 190 may further include at least one of an optical tube assembly for performing zoom in/zoom out in order to photograph the subject, a motor unit for controlling the movement of the optical tube assembly, and a flash for providing a secondary light source needed for photographing the subject.

Each of the first and second external electronic devices 102 and 104 may be a device which is the same as or different from the electronic device 101. According to an embodiment, the server 106 may include a group of one or more servers. According to various embodiments, all or some of the operations executed in the electronic device 101 may be carried out in another or a plurality of electronic devices (e.g., the external electronic device 102 or 104, or the server 106). According to an embodiment, when the electronic device 101 should perform some functions or services automatically or by a request, the electronic device 101 may, instead of performing the functions or services as it is, additionally request other devices (for example, the electronic device 102 or 104, or the server 106) to perform at least some functions associated therewith. The other electronic device (e.g., the electronic device 102 or 104, or the server 106) may carry out the requested functions or the additional functions and transfer the result, obtained by carrying out the functions, to the electronic device 101. The electronic device 101 may provide the requested functions or services by processing the received result as it is or additionally. To this end, for example, cloud computing, distributed computing, or client-server computing technology may be used.

The controller 120 may process at least some pieces of information acquired from other elements (for example, at least one of the memory 130, the input/output unit 150, the communication unit 170, etc.), and use the processed information in various ways. For example, the controller 120 may control at least some functions of the electronic device 101 so as to interwork with a different electronic device (for example, the electronic device 102, 104 or the server 106).

Figure 2:
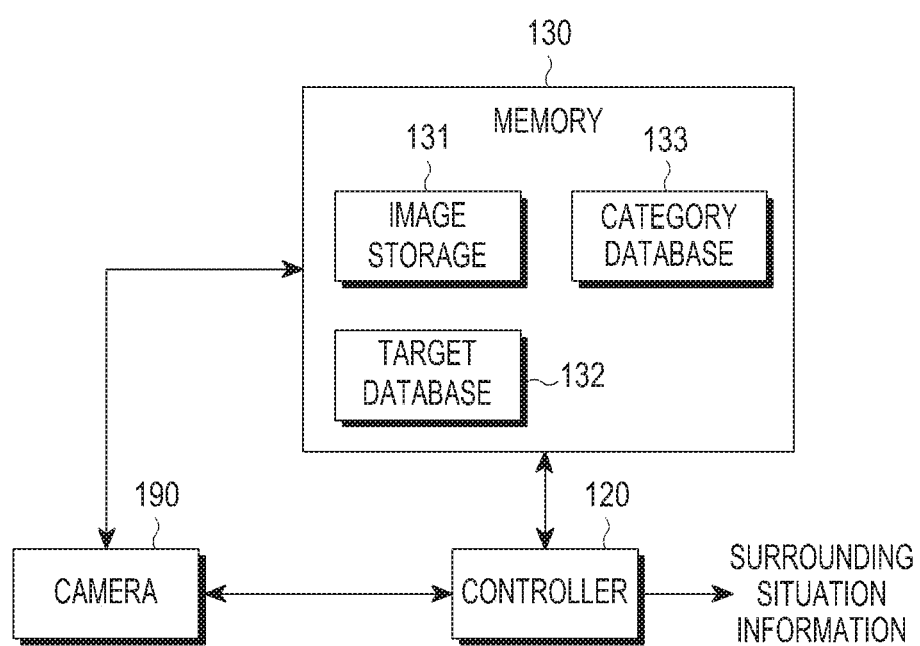
FIG. 2 is a diagram showing a main configuration of an electronic device for performing a method for notifying of surrounding situation information.

FIG. 2 is a diagram showing a main configuration of an electronic device for performing a method for notifying of surrounding situation information.

The main configuration of the electronic device 101 may include a camera 190, a memory 130, and a controller 120.

The camera 190 may photograph a surrounding environment of the electronic device 101, and output the photographed images to the controller 120.

The memory 130 may include an image storage 131 that stores at least one image received from the camera 190 or the controller 120, a target database 132 that stores data or information on a subject being recognized, and a category database 133 that stores data or information on the composition/arrangement of subjects.

The image storage 131 may store an image received from the camera 190 or the controller 120 as a file format, and the image file may have various formats and extensions. For example, image files may have representative formats (and extensions) such as: BMP (*.BMP, *.RLE), JPEG (*.JPG), Compuserve GIF (*.GIF), PNG (*.PNG), Photoshop (*.PSD, *.PDD), TIFF (*.TIF), Acrobat PDF (*.PDF), RAW (*.RAW), Illustrator (*.AI), Illustrator, Photoshop EPS (*.EPS), Amiga IFF (*.IFF), FlashPix (*.FPX), Filmstrip (*.FRM), PCX (*.PCX), PICT File (*.PCT, *.PIC), Pixar (*.PXR), Scitex (*.SCT), Targa (*.TGA, *.VDA, *.ICB, *.VST), etc.

Data for subjects stored in the target database 132 may include a subject image, a feature point of the subject image (or may also be referred to as a feature image, a feature pattern, etc.). The feature point may correspond to an edge, corner, image patterns, contours, and the like.

The category database 133 may store a plurality of composition information, each of the composition information may include information on a plurality of subjects, and information on each subject may include information on a type (or name) of the subject, information on a position, size, a direction, a category of the subject, or the like.

The information on the subject type may be person, plants, animals, buildings, roads, geographic feature, natural products (e.g., sea, river, lake, sky, etc.), and the like.

The position information of the subject may be a position of a representative point of the subject (e.g., a center point), and the positions of corner points limiting the subject. These positions may be indicated by a coordinate, a ratio (e.g., the one-third position of the total horizontal dimension from the left end of an image, the one-third position of the total vertical dimension from the top of the image, etc.), and the like.

The size information of the subject may be indicated as a constant value, the coordinate (coordinates of the corner points), the ratio (e.g., the one-third position of the total horizontal dimension from the left end of an image, the one-third position of the total vertical dimension from the top of the image, etc.), and the like.

The direction information of the subject may represent a pose, an orientation, or a direction of the subject, and, for example, indicate information on the direction to which the subject is facing (for example, the front, left, right, upper, lower, and so on). The direction information of the subject may be indicated by a two-dimensional or three-dimensional rectangular coordinate system, five orientations such as front, left, right, upper, and lower, nine orientations such as front, left, right, upper, lower, upper-left, lower-left, upper-right, lower-right, etc.

The category may indicate a category/type of a full scene representing the entire input image (for example, an intersection in a city, in front of a crossing, beach, river, in front of a building/a side road/a sidewalk, etc.).

As shown in Table 1, a category database 133 may store multiple pieces of information as a plurality of record types.

TABLE 1

| Record No. | Subject type | Subject position/size | Subject direction | Category |
|---|---|---|---|---|
| A1 | B1 | C1 | D1 | E1 |
| A2 | B2 | C2 | D2 | E1 |
| A3 | B3 | C3 | D3 | E2 |
| A4 | B4 | C4 | D4 | E1/E2 |
| ... | ... | ... | ... | ... |
| An | Bn | Cn | Dn | Em |

Each record Ai ($1 \leq I \leq n$, n is an integer equal to or greater than one) includes fields of the subject type of Bi, the subject position/size of Ci, the subject direction of Di, the full scene of category Ei, etc. Multiple pieces of information may correspond to each category of Ei, and each of the subject information may include the subject type of Bi, the position/size of Ci of a plurality of subjects, the direction Di of a plurality of subjects, and the like. m is an integer smaller than n and equal to or greater than one. In addition, each piece of the subject information may correspond to a plurality of categories. The subject position/size of Ci may be represented by the coordinates of the diagonal corner points limiting the subject, the center position of the subject, and size of the subject. Each field may have one or a plurality of values, and each value may be a constant, a coordinate, a vector, a matrix, etc.

The controller 120 may recognize the subject from the image photographed by the camera 190 or the image stored in the image storage 131 of the memory 130. The controller 120 may recognize what the subject is within the input image through a recognition algorithm according to the subject type. In addition, the controller 120 may recognize at which position the subject is looking and to which direction (i.e., the position and pose of the subject).

The controller 120 may recognize a subject registered in the target database 132 from the input image through algorithms such as Scale Invariant Feature Transform (SIFT), Speeded Up Robust Features (SURF), etc., and estimate a pose by applying a template-based matching method to the recognized subject. The SIFT is disclosed in "Subject recognition from local scale-invariant features", by "Lowe, David G. (1999), in Proceedings of the International Conference on Computer Vision. 2. pp. 11501157. doi: 10.1109/ICCV.1999.790410", the SURF is disclosed in "Bay, H., Tuytelaars, T., Gool, L V, "SURF: Speeded Up Robust Features", in Proceedings of the ninth European Conference on Computer Vision, May 2006.", and the method for estimating the pose using the template-based matching method is disclosed in "Real Time Detection and Tracking for Augmented Reality on Mobile Phones,", by "Daniel Wagner, Gerhard Reitmayr, Alessandro Mulloni, Tom Drummond, Dieter Schmalstieg, in Visualization and Computer Graphics, August 2009.". The controller 120 may recognize the subject registered in the target database 132 from the input image, and may estimate the pose of the subject based on the 2D or 3D subject information stored in the target database 132.

The controller 120 may recognize the subject from the input image. The controller 120 may refer to the target database 132 for the above recognition, and the controller 120 may recognize, from the input image, an image area to be matched with the subject registered in the target database 132. Further, the controller 120 may recognize the subject without reference to the target database 132, depending on the type of the recognized target, and, for example, the controller 120 may detect edge feature points and corner feature points from the input image, and recognize plane subjects such as a rectangle, a circle, a polygon, etc. limited by the edge feature points and the corner feature points.

The controller 120 may search for category information matched to the compositions/arrangements of subjects recognized from the category database 133. The controller 120 may detect categories which are based on the types, positions, and/or directions of the subjects.

The controller 120 may generate surrounding situation information (for example, text, images, sound, vibration, sound) based on information on the recognized subjects (for example, the types, positions, and/or directions of the recognized subjects), categories of the recognized subjects, and/or position information of the electronic device 101 (such as position information through the GPS sensor 184), and output the surrounding situation information to the corresponding element/device (for example, the input/output unit 150, the communication unit 170, and the first external electronic device 102).

Figure 3:
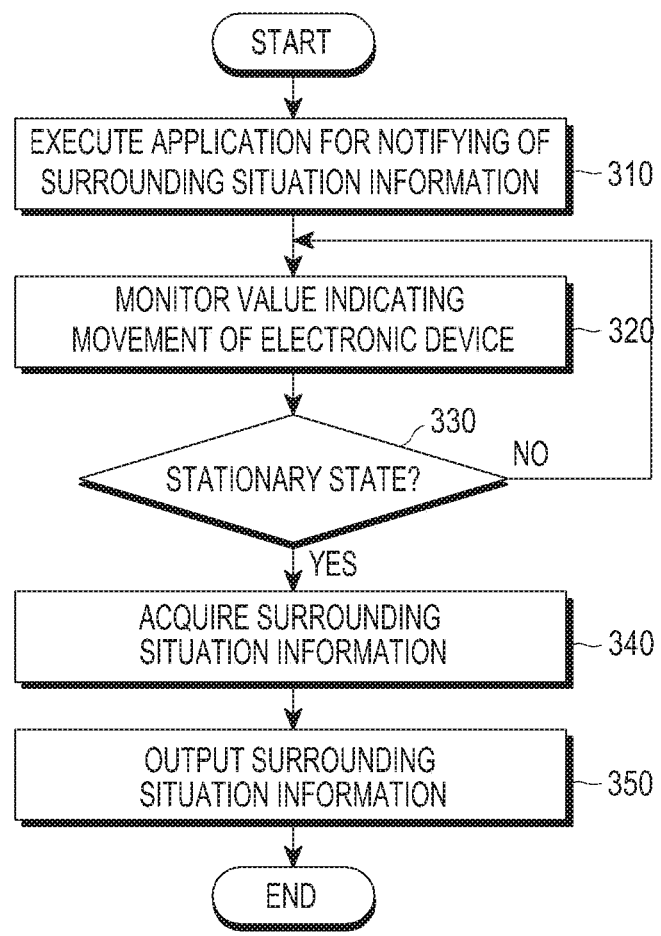
FIG. 3 illustrates a flow chart showing a method for notifying of surrounding situation information in accordance with various embodiments.
Figure 4:
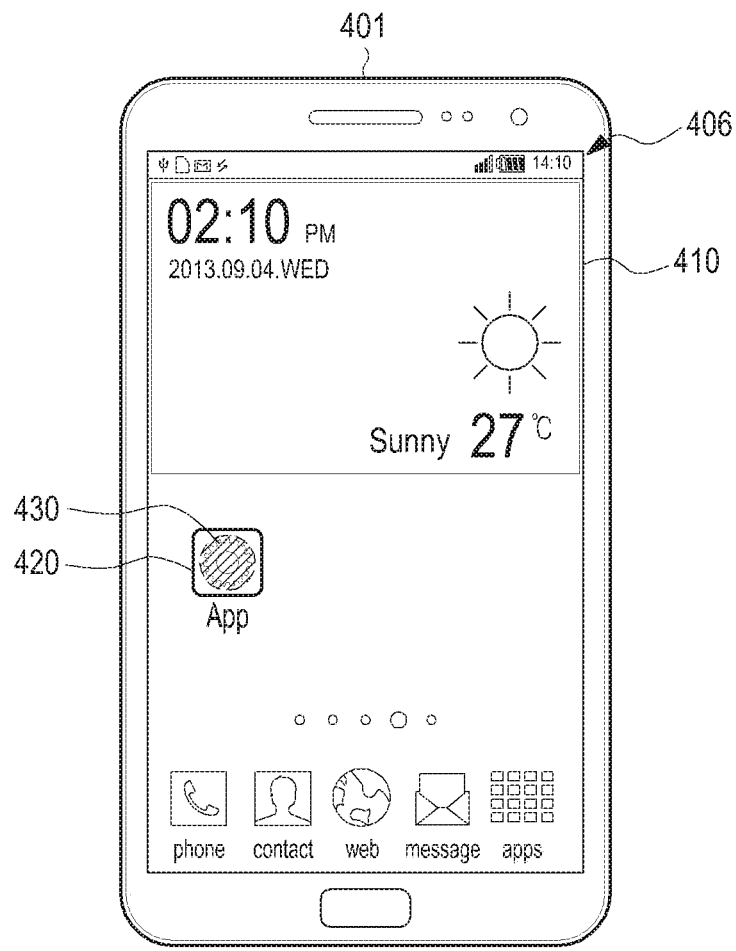
FIG. 4 to FIG. 6 are diagrams for explaining a method for notifying of surrounding situation information.
Figure 5:
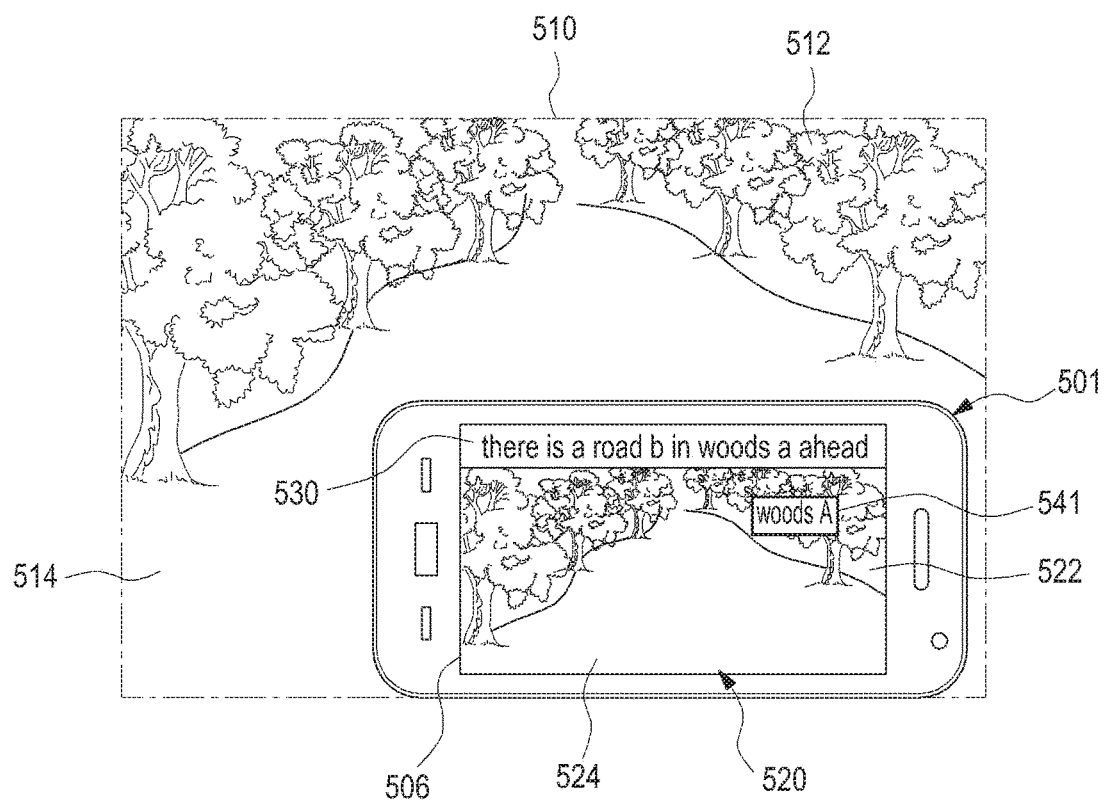
Figure 6:
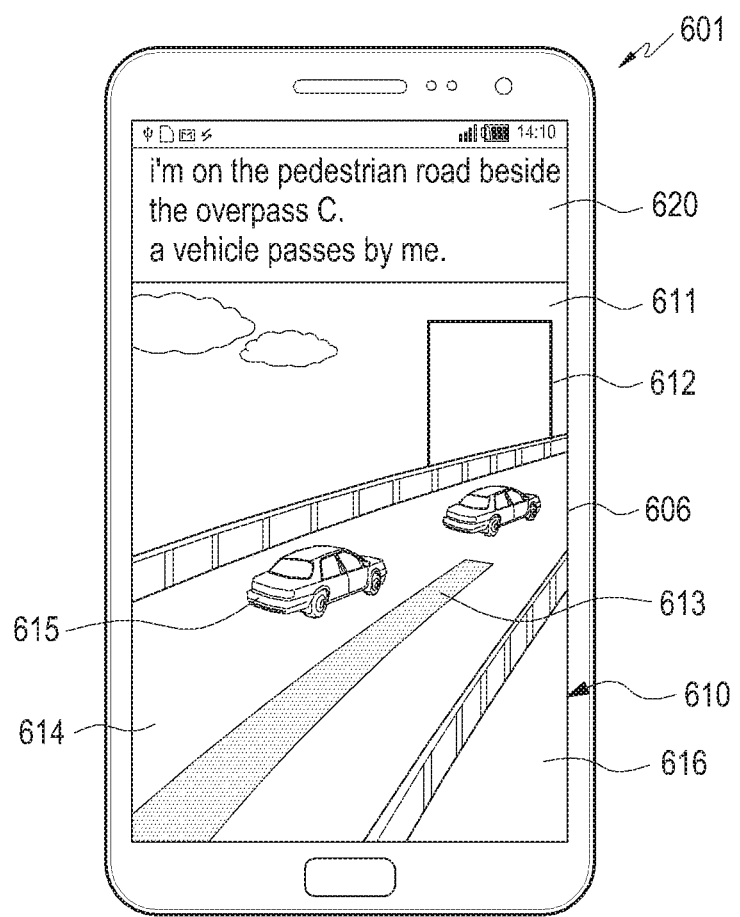

FIG. 3 illustrates a flow chart showing a method for notifying of surrounding situation information in accordance with various embodiments. FIG. 4 to FIG. 6 are diagrams for explaining a method for notifying of surrounding situation information. The method for notifying of surrounding situation information may include operations 310 to 350.

In operation 310, a controller (for example, the controller 120) of an electronic device (for example, the electronic device 101) may execute an application (for example, a voice recognition application) for notifying of the surrounding situation information according to a user input or an automatic setting. The user input may be a hovering gesture or a touch gesture of a user, the user's eyes, the user's motion gesture, or a voice command.

In an embodiment, the application is executed according to the user's selection or an automatic setting, and a screen of the application may be displayed through the display (for example, display 160) of the electronic device. The screen of the application may be referred to as a Graphical User Interface (GUI), an application screen, an application window, etc. The application may be a built-in application installed in the electronic device by a manufacturer of the electronic device, or a user installed application. The screen may correspond to the image seen through the display when the application is executed.

When the application is executed by the user input, the user input may be received through an input/output unit (for example, the input/output unit 150), a sensor unit (for example, the sensor unit 180), a communication unit (for example, the communication unit 170), a camera (for example, the camera 190), or the display. The user may select a button, an icon, or a menu (or a menu item) through the input/output unit or the display, input text through the input/output unit or the display, input the voice command through the microphone of the input/output unit, perform a gesture or a motion input through the camera, or wirelessly input the execution command of a specific application through the communication unit.

The gesture or motion input may refer to a case in which, for example, user's hand and finger draws a predetermined pattern of locus, such as a linear shaped, circular, polygonal (triangular, rectangular), zig-zag, etc., in the air within a field of view of the camera or the sensing range of the sensor module. At this time, the gesture may be referred to as a space gesture to be distinguished from the touch gesture. At this time, when directly touching the display, the touch gesture may include a case of hovering on the display.

Referring to FIG. 4, a home screen 410 is displayed on a display 406 of an electronic device 401, and an item 420 for the execution of the application for notifying of the surrounding situation information may be displayed on the home screen 410.

The user input 430 for selecting the item 420 may be received (or sensed or detected). The application may be executed in response to the user input 430. According to the execution of the application, the screen of the application may be displayed or the screen of the other application associated with the application (for example, a camera application) may be displayed. The application may be performed in the background in a state where there is no display on the screen or where only an identifier of the application is displayed on the screen.

In operation 320, the controller may monitor a value indicating a movement of the electronic device.

In an embodiment, the controller may acquire images of a surrounding environment of the electronic device photographed through the camera. The controller may acquire a value indicating the movement of a subject within the images as a value indicating the movement of the electronic device.

In an embodiment, the controller may select fixed things (such as buildings, roads, bridges, etc.) among subjects within the images. The controller may acquire a value indicating the movement of the fixed things within the images as a value indicating the movement of the electronic device.

In an embodiment, the controller may estimate a global motion of the other image based on a reference image selected among the images. For instance, the global motion may mean the movement of all subjects, mainly due to the movement of the camera such as the movement or rotation of the camera. A local movement may mean a partial movement of some of or one of the subjects. In addition, an estimation of the movement may mean obtaining the motion vector or the matrix. Since a plurality of methods for estimating the global movement are known, a description thereof will be omitted.

In an embodiment, the controller may acquire a value indicating the movement of the electronic device by using a motion sensor (such as, the motion sensor 182) of the electronic device.

In an embodiment, the controller may acquire both a value indicating the movement of the subject within the images and a value indicating the movement of the electronic device using the motion sensor.

In operation 330, the controller may determine whether the state of the electronic device is a stationary state on the basis of the value indicating the movement of the electronic device. When the state of electronic device is not a stationary state, the controller 320 may repeat the operation 320. When the state of electronic device is a stationary state, the controller 340 may perform operation 340.

In an embodiment, the controller may compare a value indicating the movement of the electronic device with a predetermined threshold value. When the value indicating the movement of the electronic device is equal to or smaller than a predetermined threshold value, the controller may determine that the state of the electronic device is a stationary state. When the value indicating the movement of the electronic device is greater than the predetermined threshold value, the controller may determine that the state of the electronic device is not a stationary state (that is, the movement state).

In an embodiment, the controller may compare values indicating the movement of the electronic device with a predetermined threshold for a predetermined time (for example, 1 to 3 seconds). When the values indicating the movement of the electronic device for a predetermined time are equal to or smaller than a predetermined threshold value, the controller may determine that the state of the electronic device is a stationary state. The values indicating the movement of the electronic device may be input to the controller at regular intervals. The controller may determine whether second values after the first value indicating the movement of the electronic device are maintained at values equal to or smaller than predetermined threshold value for the predetermined time from the time point where the first value indicating the movement of the electronic device is equal to or smaller than the predetermined threshold value. When the value indicating the movement of the electronic device for the predetermined time is greater than a predetermined threshold value, the controller may determine that the state of the electronic device is not a stationary state (that is, the movement state). When it is determined that the state of the electronic device is a non-stationary state (that is, the movement state), the controller may determine whether the values indicating the movement of the electronic device to be input at a later time are maintained at a value equal to or smaller than the predetermined threshold value for a predetermined time.

In an embodiment, the controller may determine that the state of the electronic device is in a stationary state when both the value indicating the movement of the subjects within the images and the value indicating the movement of the electronic device using the motion sensor are acquired, and both of the two values are maintained at the predetermined threshold value or below.

In operation 340, the controller may acquire the surrounding situation information of the electronic device to be notified to the user.

In an embodiment, the controller may acquire images of a surrounding environment of the electronic device photographed through the camera. For example, the controller may acquire images of the surrounding environment of the electronic device, photographed through the camera after the time point at which the state of the electronic device is determined as a stationary state, or photographed through the camera prior to the determined time point, or photographed through the camera before/after the determined time point. The controller may acquire information on subjects within the image as the surrounding situation information.

In an embodiment, the controller may acquire information on the composition and name of each subject within the image in the surrounding environment as the surrounding situation information.

In an embodiment, the controller may determine the category of the full-scene of the image based on the composition of the subjects within the image of the surrounding environment. The controller may acquire the category of the full-scene of the image as the surrounding situation information.

In an embodiment, the controller may determine the category of the full-scene of the image based on the composition of the subjects, for each of the images of the surrounding environment. The controller may acquire information on a category which is duplicated once or more among the categories determined for the images, as the surrounding situation information.

In an embodiment, the controller may recognize subjects within the image for each of the images in the surrounding environment. The controller may acquire information on at least one subject which is duplicated once or more among the subjects within the images, as the surrounding situation information.

In operation 350, the controller may output the surrounding situation information. For example, the controller may display the surrounding situation information in visual, auditory, and/or tactile form. For example, when the surrounding situation information is a text, the controller may convert the text into audio, and output the converted audio. For example, when the surrounding situation information is a warning message, the controller may output a warning sound and/or vibration. For example, a method for outputting the surrounding situation information may include: a method for displaying text information on a pop-up window, a method for displaying text information on a screen, a method for displaying text information on the top indicator of the full screen of the display, flashing lights, audio signal output, talkback, Text-To-Speech (TTS), vibration, and the like. In addition, a method for outputting the surrounding situation information may include all methods which can provide information to the user by using all means recognizable by the user.

In an embodiment, the controller may output the surrounding situation information, as the sound, through the speaker (for example, the speaker 152) of the input/output unit.

Referring to FIG. 5, a surrounding environment 510 of an electronic device 501 may include woods A and road B 514 having a plurality of trees 512 therein.

The electronic device 501 may display, on a display 506, an image 520 (such as, a live preview image) in which the surrounding environment 510 is photographed through the camera (for example, the camera 190). Unlike the present embodiment, the electronic device 501 may include a transparent display, and the user may see the surrounding environment 510 through the transparent display.

The electronic device 501 may recognize subjects (for example, woods, a tree 522, and a road 524) within the image 520 by using a target database (for example, the target database 133) stored in the memory (for example, the memory 130).

The electronic device 501 may determine a category (for example, the road in the woods) of the full-scene in which the image 520 is fully shown, by using a category database (for example, the category database 133) stored in the memory.

In an embodiment, the electronic device 501 may recognize the position of the electronic device 501 using a GPS sensor (the GPS sensor 184). For example, the electronic device 501 may determine specific titles (for example, woods A, road B) of the subjects by using the recognized position.

The electronic device 501 may generate surrounding situation information on the basis of the information on the subject, information on the category, and/or position information, and output the surrounding situation information. For example, the electronic device 501 may display, on the display 506, the surrounding situation information (for example, a message 530 reading "there is a road B in woods A ahead".

The electronic device 501 may output, as a voice, the surrounding situation information (a message reading "there is a road B in woods A ahead") through the speaker (for example, the speaker 152).

The electronic device 501 may transmit, through a communication unit (such as the communication unit 170), the surrounding situation information (a message reading "there is a road B in woods A ahead") to an external electronic device (for example, the first external electronic device 102) and the external electronic device may output the surrounding situation information.

In an embodiment, the electronic device 501 may display, on the display 506, a virtual image (for example, woods A 541, road B) representing the information on the subject within the image 520 (such as a tree 522, a road 524).

Referring to FIG. 6, an electronic device 601 may display, on a display 606, an image 610 (such as, a live preview image) in which the surrounding environment 510 is photographed through the camera (for example, the camera 190). Unlike the present embodiment, the electronic device 601 may include a transparent display, and the user may see the surrounding environment 510 through the transparent display.

The electronic device 601 may recognize subjects (for example, sky 611, buildings 612, a centerline 613, road 614, cars 615, sidewalk 616) within the image 610 by using a target database (for example, the category database 132) stored in the memory (for example, the memory 130).

The electronic device 601 may determine a category (for example, a pedestrian road) of the full-scene in which image 610 is fully shown, by using a category database (for example, the category database 133) stored in the memory.

In an embodiment, the electronic device 601 may recognize the position of the electronic device 601 using a GPS sensor (the GPS sensor 184). For example, the electronic device 601 may determine specific titles (for example, an overpass C, buildings D) of the subjects by using the recognized position.

The electronic device 601 may generate surrounding situation information on the basis of the information on the subject, information on the category, and/or position information, and output the surrounding situation information. For example, the electronic device 601 may display, on the display 606, the surrounding situation information (for example, a message 620 reading "I'm on the pedestrian road beside the overpass C. A vehicle passes by me").

The electronic device 601 may output, as a voice, the surrounding situation information (a message reading "I'm on the pedestrian road beside the overpass C. A vehicle passes by me") through the speaker (for example, the speaker 152).

The electronic device 601 may transmit, through a communication unit (for example, the communication unit 170), the surrounding situation information (a message reading "I'm on the pedestrian road beside the overpass C. A vehicle passes by me") to an external electronic device (for example, the first external electronic device 102), and the external electronic device may output the surrounding situation information.

In an embodiment, the electronic device 601 may display, on the display 606, a virtual image representing information on the subject within the image 610.

Figure 7:
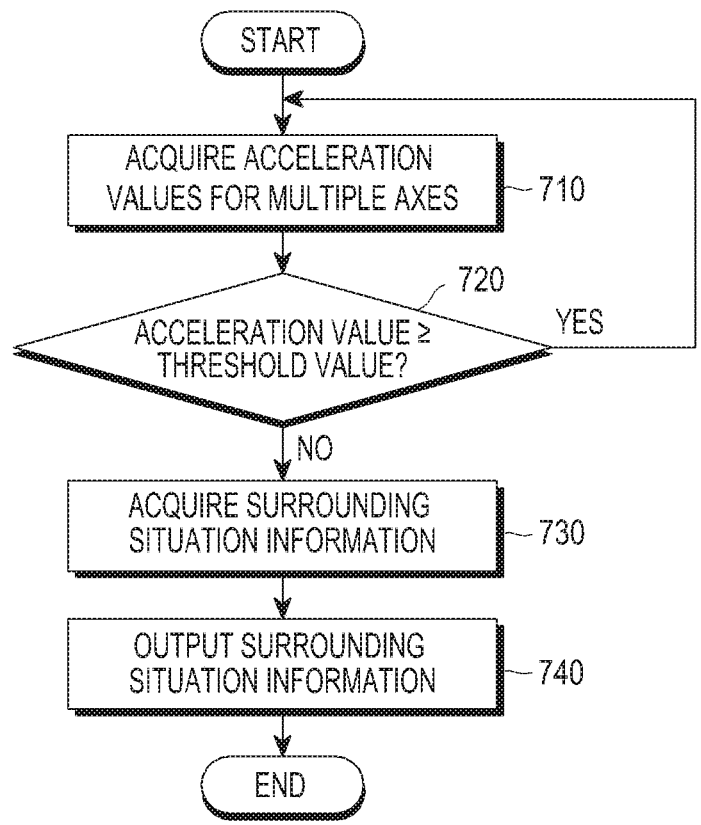
FIG. 7 illustrates a flow chart showing a method for notifying of surrounding situation information in accordance with various embodiments.
Figure 8:
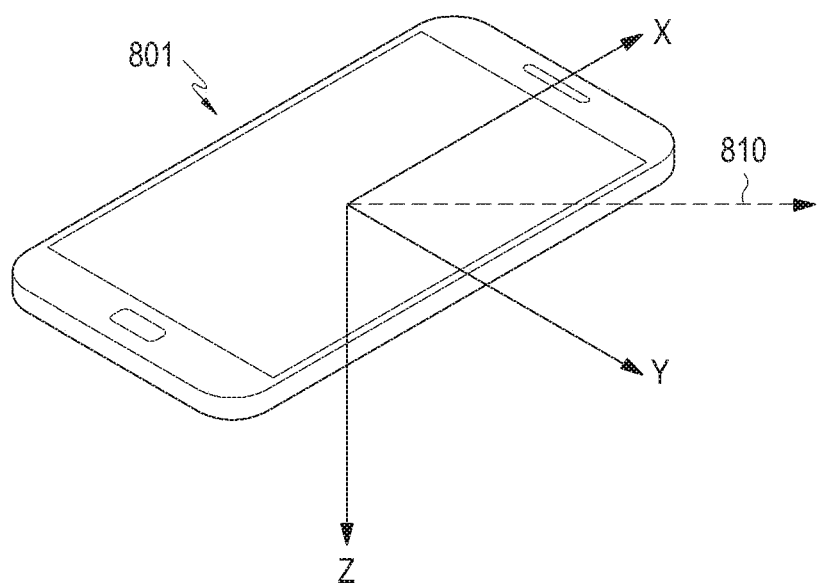
FIG. 8 is a diagram for explaining a method for notifying of surrounding situation information.

FIG. 7 illustrates a flow chart showing a method for notifying of surrounding situation information in accordance with various embodiments. FIG. 8 is a diagram for explaining a method for notifying surrounding situation information. The method for notifying of surrounding situation information may include operations 710 to 740.

In operation 710, the controller (for example, the controller 120) of the electronic device (for example, the electronic device 101) may acquire acceleration values for a plurality of axes using an acceleration sensor which correspond to a motion sensor (such as the motion sensor 182).

Referring to FIG. 8, when the electronic device 801 is assumed to have the form of a rectangle bar, an X-axis may be set corresponding to the longitudinal direction (or longitudinal direction) of the electronic device 801, a Y-axis may be set corresponding to the horizontal direction (or lateral direction) of the electronic device 801, and a Z-axis (a direction perpendicular to the surface of the display) may be set perpendicular to the X-axis and Y-axis.

The acceleration sensor of the electronic device 801 may output an acceleration value (i.e., an X-axis acceleration value) that occurs as the electronic device 801 moves along the X-axis (+X-axis direction or −X-axis direction), an acceleration value (i.e., a Y-axis acceleration value) that occurs as the electronic device 801 moves along the Y-axis (+Y-axis direction or −Y-axis direction), and an acceleration value (i.e., a Z-axis acceleration value) that occurs as the electronic device 801 moves along the Z-axis (+Z-axis direction or −Z-axis direction).

The controller may sum up the X-axis, Y-axis and Z-axis acceleration values input from the acceleration sensor so as to calculate the motion vector 810.

In operation 720, the controller may compare each of the acceleration values for the plurality of axes with a predetermined threshold value. When at least one of the acceleration values is equal to or greater than the predetermined threshold value, the state of the electronic device may be determined to be non-stationary. When all the acceleration values (or the magnitude of the motion vector) are smaller than the predetermined threshold value, the controller may determine that the state of the electronic device is a stationary state. When the electronic device is not in a stationary state (or at least one of the acceleration values is equal to or greater than the predetermined threshold value), the controller may repeat the operation 710. When the electronic device is in a stationary state (or all the acceleration values are smaller than the predetermined threshold value), the controller may perform the operation 730.

In an embodiment, the controller may compare each of the acceleration values for the plurality of axes for a predetermined time with a predetermined threshold value. When all the acceleration values (or the size of the motion vector) are smaller than the predetermined threshold, for the predetermined time, the state of the electronic device may be determined to be a stationary state. The acceleration values (or motion vectors) may be input to the controller at regular intervals. The controller may determine whether sizes of second motion vectors after a first motion vector indicating the movement of the electronic device are maintained at values smaller than the predetermined threshold value for the predetermined time from the time point where the size of the first motion vector representing the movement of the electronic device is smaller than the predetermined threshold value. When at least one of the motion vectors representing the movement of the electronic device for the predetermined time is greater than a predetermined threshold value, the controller may determine that the electronic device is not in a stationary state (that is, the movement state). When it is determined that the electronic device is not in a stationary state (that is, a movement state), the controller may determine whether the sizes of the motion vectors representing the movement of the electronic device to be input at a later time are maintained at values smaller than the predetermined threshold value for a predetermined time.

In operation 730, the controller may acquire the surrounding situation information of the electronic device to be notified of to the user.

In operation 740, the controller may output the surrounding situation information. For example, the controller may display the surrounding situation information in visual, auditory, and/or tactile form.

Figure 9:
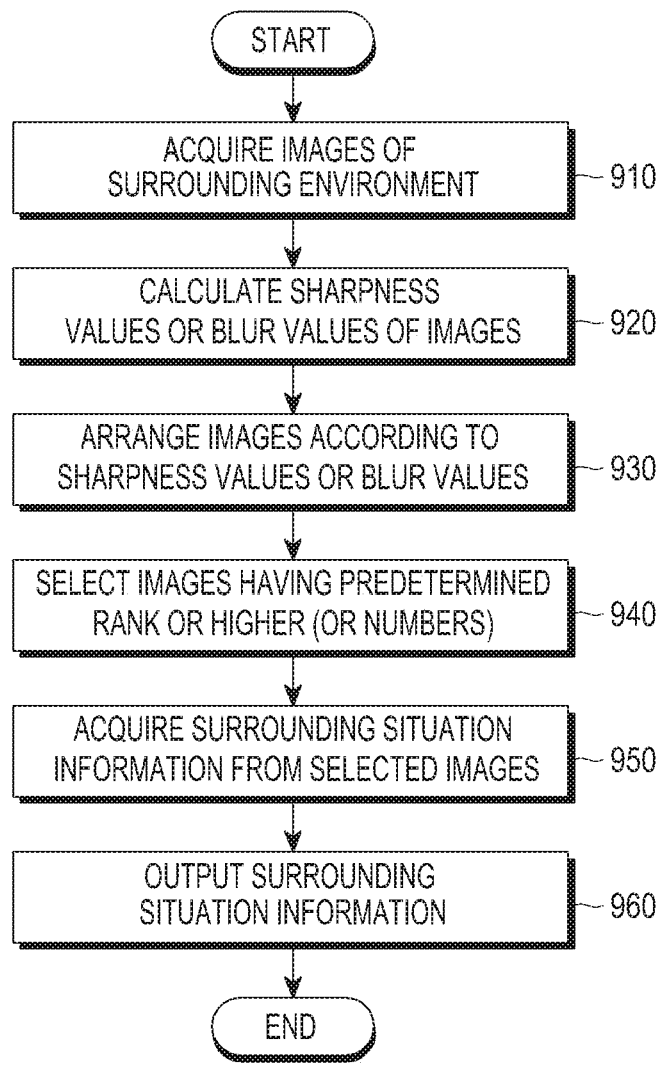
FIG. 9 illustrates a flow chart showing a method for notifying of surrounding situation information in accordance with various embodiments.

FIG. 9 illustrates a flow chart showing a method for notifying of surrounding situation information in accordance with various embodiments. The method for notifying of surrounding situation information may include operations 910 to 960.

In operation 910, a controller (for example, controller 120) of an electronic device (for example, the electronic device 101) may acquire images of a surrounding environment of the electronic device, photographed by the camera (such as camera 190). For example, the controller may acquire images of a surrounding environment of the electronic device, photographed through the camera after the time point at which the state of the electronic device is determined to be a stationary state, photographed through the camera prior to the determined time point, or photographed through the camera before/after the determined time point.

In operation 920, the controller may calculate values representing the sharpness for at least some of the images (i.e., sharpness values) or values representing blur (that is, blur values).

In an embodiment, the controller may select one of the images as a reference image, and calculate relative sharpness values or blur values for the other images among the images by comparing the other images with the selected reference images. For example, the controller may select, as the reference image, a first image photographed by the camera after the time point when the state of the electronic device is determined to be a stationary state. For example, the controller may generate a differential image between the reference image and the other images, and determine the thickness of an edge part of a subject in the differential image as a blur value. The differential image may be an image of which a pixel value of the position has a value obtained by subtracting a pixel value at the same position of the other image from each pixel value of the reference image.

In an embodiment, the controller may calculate the sharpness value or blur value for each image. For example, the controller may determine the thickness of the edge portion of the subject in each image as the blue value of the image.

For example, the controller may resize the images as a large size and then calculate sharpness values or blur values for the resized images.

In operation 930, the controller may arrange the images according to the sharpness values or blur values. For example, the controller may arrange the image in ascending order of the blur values.

In operation 940, the controller may select images having a rank higher than a predetermined rank (or numbers). For example, the controller may select top three images among 10 to 30 images input after the reference image.

In operation 950, the controller may acquire, from the selected images, the surrounding situation information of the electronic device to be notified of to the user.

In operation 960, the controller may output the surrounding situation information. For example, the controller may display the surrounding situation information in visual, auditory, and/or tactile form.

Figure 10:
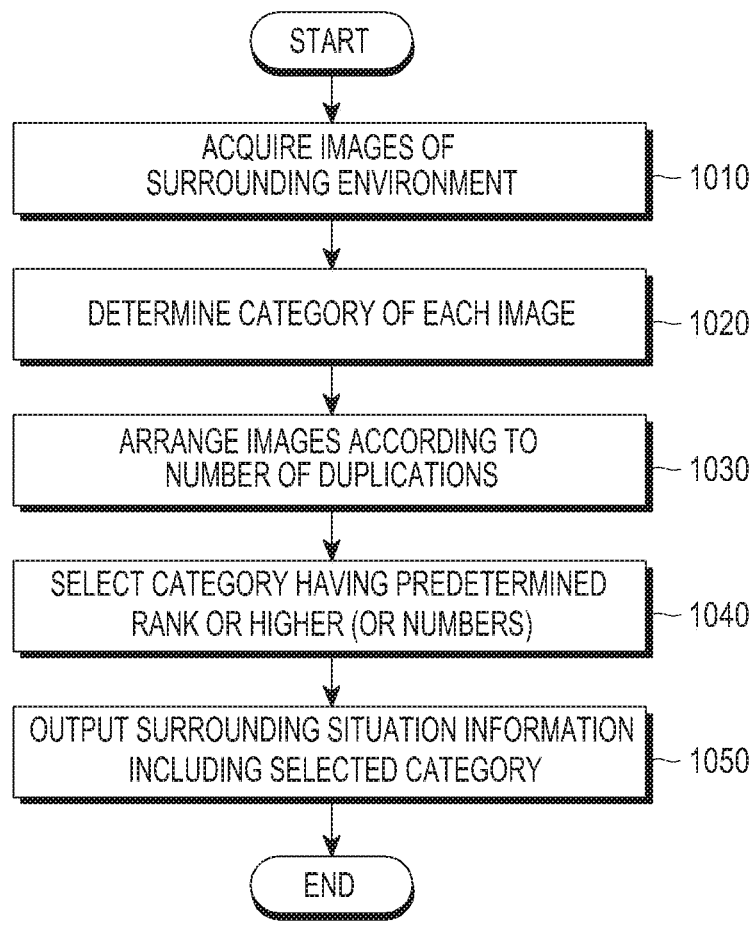
FIG. 10 illustrates a flow chart showing a method for notifying of surrounding situation information in accordance with various embodiments.

FIG. 10 illustrates a flow chart showing a method for notifying of surrounding situation information in accordance with various embodiments. The method for notifying of surrounding situation information may include operations 1010 to 1050.

In operation 1010, a controller (for example, controller 120) of an electronic device (for example, the electronic device 101) may acquire images of a surrounding environment of the electronic device, photographed by the camera (such as camera 190). For example, the controller may acquire images of a surrounding environment of the electronic device, photographed through the camera after the time point at which the state of the electronic device is determined to be a stationary state, photographed through the camera prior to the determined time point, or photographed through the camera before/after the determined time point.

In operation 1020, the controller may search for, with respect to the respective images, category information that matches to the composition/configuration of the subjects recognized in the database (such as the category database 133) stored in memory (such as the memory 130). The controller 120 may determine categories which are based on the types, positions, and/or directions of the subjects.

In operation 1030, the controller may sort the categories according to the number of duplications. For example, the controller may arrange categories in descending order of the number of duplications.

In operation 1040, the controller may select images having a rank equal to or higher than a predetermined rank (or numbers) among the categories. For example, the controller may select one top category from among the categories.

In operation 1050, the controller may output the surrounding situation information including the selected category.

Figure 11:
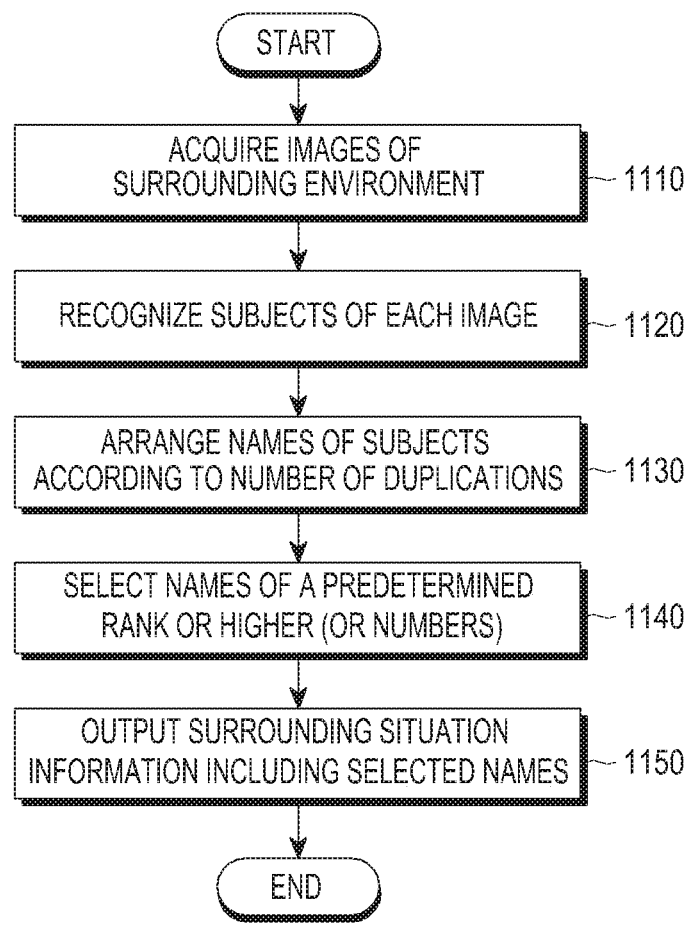
FIG. 11 illustrates a flow chart showing a method for notifying of surrounding situation information in accordance with various embodiments.

FIG. 11 illustrates a flow chart showing a method for notifying of surrounding situation information in accordance with various embodiments. The method for notifying of surrounding situation information may include operations 1110 to 1150.

In operation 1110, a controller (for example, controller 120) of an electronic device (for example, the electronic device 101) may acquire images of a surrounding environment of the electronic device, photographed through the camera (such as camera 190). For example, the controller may acquire images of a surrounding environment of the electronic device, photographed through the camera after the time point at which the state of the electronic device is determined to be a stationary state, photographed through the camera prior to the determined time point, or photographed through the camera before/after the determined time point.

In operation 1120, the controller may recognize, from the respective images, subjects registered in a database (for example, the target database 132) stored in a memory (for example, the memory 130). The controller may determine names of the recognized subjects in the respective images based on the database.

In operation 1130, the controller may arrange the names of the recognized subjects according to the number of duplications. For example, the controller may arrange all the names of subjects recognized from the images according to the number of duplications. For example, the controller may arrange the names determined for each of the recognized subjects. For example, different names may be determined for the same subject according to the quality or state of each image. For example, the controller may arrange the names in descending order of the number of duplications.

In operation 1140, the controller may select names having a rank equal to or higher than a predetermined rank (or numbers) among the names. For example, the controller may select at least one duplicated name from among the names.

In operation 1150, the controller may output the surrounding situation information including the selected name of the subject.

Figure 12:
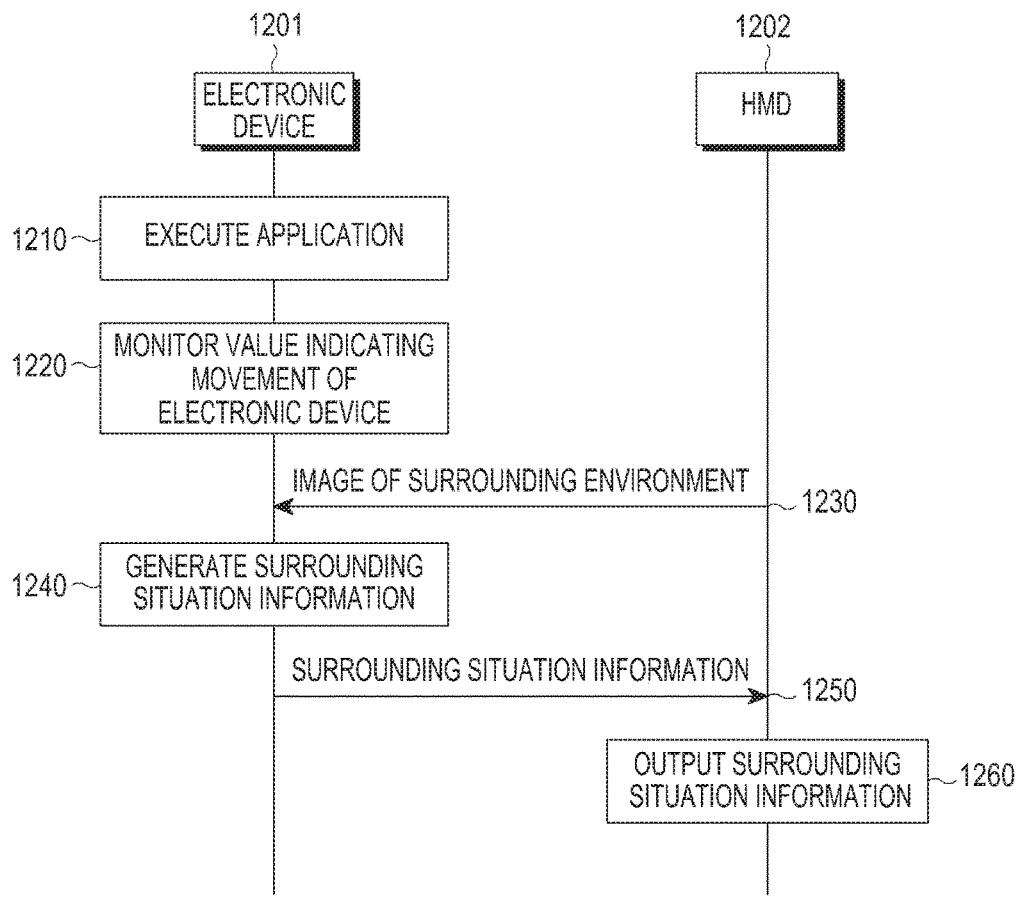
FIG. 12 illustrates a flow chart showing a method for notifying of surrounding situation information in accordance with various embodiments.

FIG. 12 illustrates a flow chart showing a method for notifying of surrounding situation information in accordance with various embodiments. The method for notifying of surrounding situation information may include operations 1210 to 1260.

In operation 1210, a controller (for example, the controller 120) of an electronic device (for example, the electronic device 101) may execute an application (for example, a voice recognition application) for notifying of the surrounding situation information according to a user input or automatic setting. The user input may be a hovering gesture or a touch gesture of a user, the user's eyes, the user's motion gesture, or a voice command. The electronic device 1201 may receive an execution command from a head-mounted device (HMD, 1202) and perform the application according to the execution command.

The head-mounted device 1202 may generally have the appearance of glasses, and may be referred to as a wearable display device, smart glasses, etc. The head-mounted device 1202 may have a configuration the same as or similar to the electronic device 1201. The electronic device 1201 and the head worn device 1202 may be wirelessly connected to each other via Wi-Fi, Bluetooth, etc. The head-mounted device 1202 may execute the application on its own, or transmit a command of executing the application to the electronic device 1201, based on a user input.

In operation 1220, the electronic device 1201 may monitor a value indicating a movement of the electronic device 1201 and/or the head-mounted device 1202.

In an embodiment, the electronic device 1201 may acquire the images of a surrounding environment of the electronic device 1201 photographed through the camera (such as the camera 190). The electronic device 1201 may acquire a value indicating the movement of a subject within the images as a value indicating the movement of the electronic device 1201.

In an embodiment, the electronic device 1201 may acquire a value indicating the movement of the electronic device 1201 by using a motion sensor (such as, the motion sensor 182).

In an embodiment, the electronic device 1201 may receive a value indicating the movement of the head-mounted device 1202 from the head-mounted device 1202.

In an embodiment, the electronic device 1201 may receive, from the head-mounted device 1202, the image of the surrounding environment photographed through the camera of the head-mounted device 1202, and the electronic device 1201 may acquire, from the image, a value indicating the movement of the head-mounted device 1202.

In operation 1230, the electronic device 1201 may receive, from the head-mounted device 1202, the image of the surrounding environment photographed through the camera of the head-mounted device 1202. For example, the electronic device 1201 may request the head-mounted device 1202 to transmit the image, after the time point at which it is determined that the electronic device 1201 or the head-mounted device 1202 is in a stationary state. In an embodiment, the operation 1230 may be performed prior to the operation 1220.

In operation 1240, the electronic device 1201 may generate, from the received image, surrounding situation information to be notified of to the user.

In an embodiment, the electronic device 1201 may acquire information on the composition and name of each subject within the images in the surrounding environment, as the surrounding situation information.

In operation 1250, the electronic device 1201 may transmit the surrounding situation information to the head-mounted device 1202.

In operation 1260, the head-mounted device 1202 may output the surrounding situation information.

Figure 13:
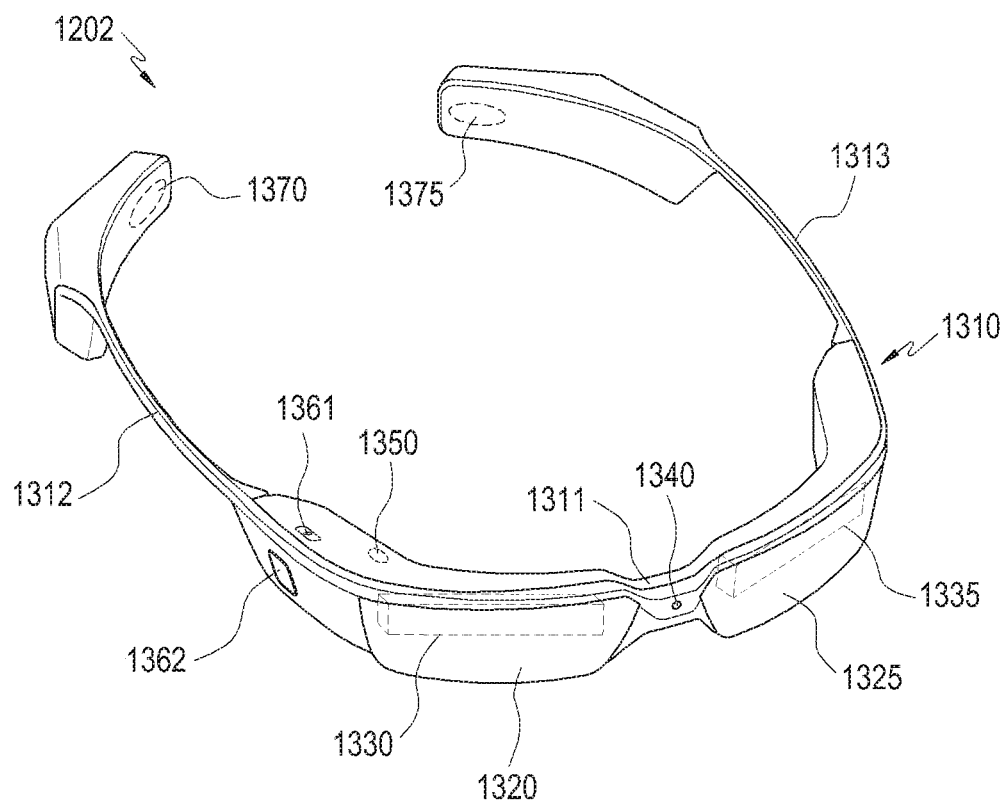
FIG. 13 is a perspective view showing a head-mounted device according to various embodiments.
Figure 14:
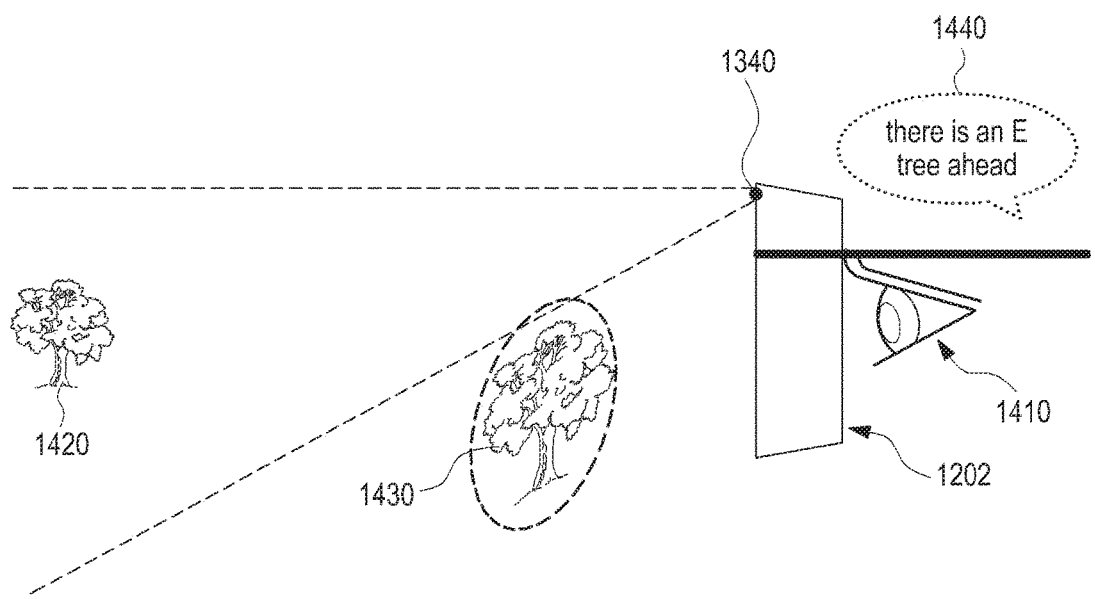
FIG. 14 is a diagram for explaining an operation of a head-mounted device.

FIG. 13 is a perspective view showing a head-mounted device according to various embodiments. FIG. 14 is a diagram for explaining an operation of a head-mounted device.

The head-mounted device 1202 may include a housing 1310, first and second windows 1320 and 1325, first and second projectors 1330 and 1335, a camera 1340, a motion sensor 1350, a power button 1361, a touch sensor 1362, and first and second speakers 1370 and 1375.

The housing 1310 may be implemented by having some elements of the head-mounted device 1202 therein, and other elements of the head-mounted device 1202 may be installed in the housing 1310 so as to expose some of other elements to the outside. For example, the head-mounted device 1202 may include some or all of the configurations of the electronic device shown in FIG. 1 (for example, the bus 110, the controller 120, the memory 130, the input/output unit 150, the communication unit 170, and the sensor unit 180).

The housing 1310 may include a front frame 1311 to which first and second windows 1320 and 1325 facing the user's right eye and left eye are fixed, and first and second temple frames 1312 and 1313 extended from opposite ends of the front frame 1311. The right eye and left eye may be referred to as a first eye and a second eye. The first and second windows 1320 and 1325 may be referred to as first and second glasses.

The camera 1340 may be disposed in front of the front frame 1311, and a power button 1361 and a touch sensor 1362 may be further disposed on the upper surface of the front frame 1311 and the side thereof, respectively.

The camera 1340 is disposed so as to facing forward in front of the front frame 1311 and the images in which the surrounding environment is photographed in front of the head-mounted device 1202 may be output to a processor of the head-mounted device 1202.

The motion sensor 1350 may detect a movement of the head-worn unit 1202 (for example, rotation of the head-mounted device 1202, the acceleration or vibration of the head-mounted device 1202), and output a value indicating the movement of the head-worn unit 1202 to the processor.

The power button 1361 may be disposed on an upper surface of the front frame 1311, and the power of the head-mounted device 1202 may be turned on/off through the user input to the power button 1361.

The touch sensor 1362 may be disposed on the side of the front frame 1311, detect at least one touch/hovering input, and output the input information to the processor.

The first projector 1330 may be disposed between the user's right eye and the first window 1320, and project the light for forming an image on the user's right eye.

The second projector 1335 may be disposed between the user's left eye and the second window 1325, and project the light for forming an image on the user's left eye.

Referring to FIG. 14, the surrounding environment of the head-mounted device 1202 includes a tree 1420.

The head-mounted device 1202 may transmit an image of the surrounding environment photographed through the camera 1340 to the electronic device 1201. For example, the head-mounted device 1202 may receive, from the electronic device 1201, surrounding situation information including a text message and an image.

The head-mounted device 1202 may convert the text message into a voice message, and output a voice message 1440 (for example, "There is an E tree ahead.") through first and/or second speaker 1370 and/or 1375.

The head-mounted device 1202 may provide the light that forms the image by using the first and/or second projectors 1330 and 1335 to the user's eye 1410, so as to provide a virtual image 1430. For example, the virtual image may be an image of enlarging the tree 1420 at a close distance, if the tree is at a distance from the user. For example, the virtual image may be a high definition (or high quality) image of the tree 1420, a sharpness increased image, a vector graphics image, an image of the local area, an image photographed when the amount of light is abundant (i.e., an image photographed at the state of high ambient light) and the like.

Figure 15:
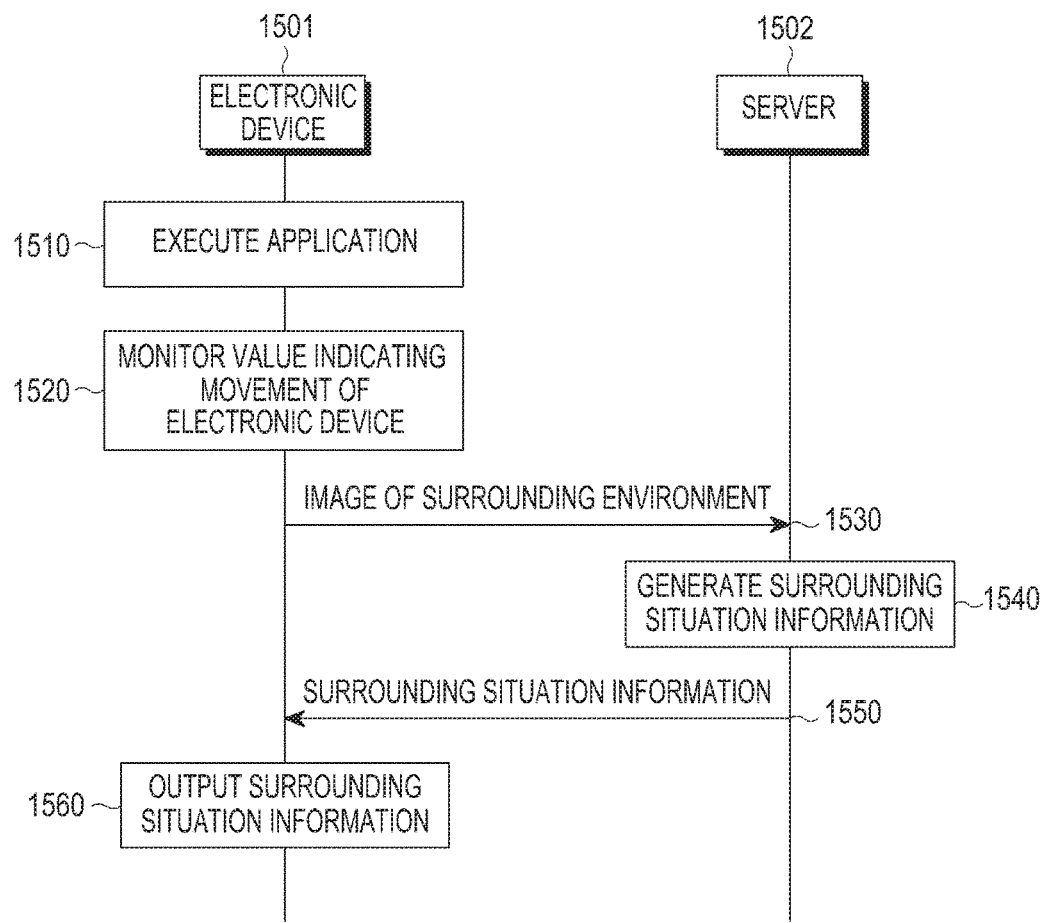
FIG. 15 illustrates a flow chart showing a method for notifying of surrounding situation information in accordance with various embodiments.

FIG. 15 illustrates a flow chart showing a method for notifying of surrounding situation information in accordance with various embodiments. The method for notifying of surrounding situation information may include operations 1510 to 1560.

In operation 1510, a controller (for example, the controller 120) of an electronic device 1501 (for example, the electronic device 101) may execute an application (for example, a voice recognition application) for notifying of the surrounding situation information according to a user input or an automatic setting. The user input may be a hovering gesture or a touch gesture of a user, the user's eyes, the user's motion gesture, or a voice command.

In an embodiment, the electronic device 1501 may receive an execution command from other electronic devices (for example, the first external electronic device 102, the second external electronic device 104, the server 106, the wearable device (such as the head-mounted device 1202, or a smart watch)), and may execute the application according to the execution command.

In operation 1520, the electronic device 1501 may monitor a value indicating the movement of the electronic device 1501 and/or the wearable device.

In operation 1530, the electronic device 1501 may transmit the images of the surrounding environment photographed through the camera (such as the camera 190) to a server 1502 (for example, the server 106). For example, after the time point when the electronic device 1501 or the wearable device is determined to be in a stationary state, the electronic device 1501 may transmit an image of the surrounding environment to the server 1502. In an embodiment, the operation 1530 may be performed prior to the operation 1520. The sever 1502 may have a configuration the same as or similar to the electronic device 1501.

In operation 1540, the server 1502 may generate, from the received image, surrounding situation information to be notified of to the user.

In an embodiment, the server 1502 may generate, as the surrounding situation information, information on the composition and name of each subject within the images in the surrounding environment.

In operation 1550, the server 1502 may transmit the surrounding situation information to the electronic device 1501.

In operation 1560, the electronic device 1501 may output the surrounding situation information by itself or through the wearable device.

The aforementioned electronic device (for example, the electronic device 101) may perform, for the external device, the function of the head-mounted device 1202 shown in FIG. 12, or the function of the server 1502 shown in FIG. 15.

According to various embodiments, a method for notifying surrounding situation information by an electronic device is provided. The method may include: monitoring a value indicating a movement of the electronic device; determining whether the electronic device is in a stationary state based on the value indicating the movement of the electronic device; when the state of the electronic device is the stationary state, acquiring information on the surrounding situation information of the electronic device to be notified of to a user; and outputting the surrounding situation information.

According to various embodiments, the monitoring of the value indicating a movement of the electronic device includes: acquiring images of the surrounding environment of the electronic device photographed through a camera of the electronic device; and acquiring a value indicating a movement of a subject within the images as the value indicating the movement of the electronic device.

According to various embodiments, the monitoring of the value indicating the movement of the electronic device includes: acquiring images of a surrounding environment of the electronic device photographed through a camera of the electronic device; selecting fixed things among subjects within the images; and acquiring a value indicating the movement of the fixed things within the images as the value indicating the movement of the electronic device.

According to various embodiments, the monitoring of the value indicating the movement of the electronic device includes acquiring the value that indicates the movement of the electronic device by using a motion sensor of the electronic device.

According to various embodiments, the monitoring of the value indicating the movement of the electronic device includes acquiring acceleration values for a plurality of axes by using an acceleration sensor of the electronic device, and the determining whether the electronic device is in a stationary state includes: comparing each of the acceleration values for the plurality of axes with a predetermined threshold value; and determining that the electronic device is not in a stationary state when at least one of the acceleration values is equal to or greater than the predetermined threshold.

According to various embodiments, the determining whether the electronic device is in the stationary state may include: comparing the value indicating the movement of the electronic device with a predetermined value; and determining that the electronic device is in a stationary state when the value indicating the movement of the electronic device is equal to or smaller than the predetermined threshold.

According to various embodiments, the determining whether the electronic device is in a stationary state based on the value indicating the movement of the electronic device includes: comparing values indicating the movement of the electronic device for a predetermined time with a predetermined threshold value; and when the values indicating the movement of the electronic device during the predetermined time are equal to or smaller than the predetermined threshold value, determining that the state of the electronic device is a stationary state.

According to various embodiments, when the electronic device is not in the stationary state, the electronic device may repeat the operation of monitoring and the operation of determining whether the electronic device is in the stationary state.

According to various embodiments, the acquiring of the surrounding situation information of the electronic device may include: acquiring the image of a surrounding environment of the electronic device photographed through the camera of the electronic device; and acquiring information on subjects within the image as the surrounding situation information.

According to various embodiments, the acquiring of the surrounding situation information of the electronic device may include: acquiring the image of a surrounding environment of the electronic device photographed through the camera of the electronic device; and acquiring information on composition and names of each of the subjects within the image as the surrounding situation information.

According to various embodiments, the acquiring of the surrounding situation information of the electronic device may include: acquiring the image of a surrounding environment of the electronic device photographed through the camera of the electronic device; determining a category of a full-scene of the image based on the composition of the subjects within the image; and acquiring the category of the full-scene of the image as the surrounding situation information.

According to various embodiments, the acquiring of the surrounding situation information of the electronic device may include: acquiring images of a surrounding environment of the electronic device photographed through the camera of the electronic device; calculating values indicating a sharpness or blur with respect to the images; selecting some of the images based on the values indicating the sharpness or the blur; and acquiring information on subjects within the selected images, as the surrounding situation information.

According to various embodiments, the acquiring of the surrounding situation information of the electronic device may include: acquiring images of the surrounding environment of the electronic device photographed through the camera of the electronic device; calculating values indicating a relative sharpness or blur with respect to remaining images of the images by comparing the remaining images with a reference image selected among the images; selecting some of the remaining images based on the values indicating the relative sharpness or the blur; and acquiring information on subjects within the selected images, as the surrounding situation information.

According to various embodiments, the acquiring of the surrounding situation information of the electronic device may include: acquiring images of the surrounding environment of the electronic device photographed through the camera of the electronic device; determining, for each of the images, a category of a full-scene of the image, based on the composition of subjects within the image; and acquiring information on a category that is duplicated at least once among categories determined with respect to the images, as the surrounding situation information.

According to various embodiments, the acquiring of the surrounding situation information of the electronic device may include: acquiring images of the surrounding environment of the electronic device photographed through the camera of the electronic device; determining, for each of the images, a category of a full-scene of the image, based on the composition of subjects within the image; arranging categories determined for the images according to the number of duplications; and acquiring information on a category having a rank equal to or higher than a predetermined rank among the arranged categories, as the surrounding situation information.

According to various embodiments, the acquiring of the surrounding situation information of the electronic device may include: acquiring images of the surrounding environment of the electronic device, photographed through the camera of the electronic device; recognizing subjects within the image with respect to each of the images; and acquiring information on at least one subject that is at least one duplicate among the subjects with the images, as the surrounding situation information.

According to various embodiments, the acquiring of the surrounding situation information of the electronic device may include: acquiring images of the surrounding environment of the electronic device photographed through the camera of the electronic device; recognizing subjects within the image with respect to each of the images; arranging names of subjects within the images according to the number of duplications; and acquiring information on a name having a rank equal to a higher than a predetermined rank among the arranged names of the subjects, as the surrounding situation information.

According to various embodiments, the outputting of the surrounding situation information may include outputting the surrounding situation information as a voice.

According to various embodiments, there is provided an electronic device. The electronic device may include: a camera; and a controller configured to monitor a value indicating a movement of the electronic device, determine whether the electronic device is in a stationary state based on the value indicating the movement of the electronic device, acquire information on the surrounding situation information of the electronic device to be notified of to a user when the state of the electronic device is in the stationary state, and output the surrounding situation information.

According to various embodiments, the controller may be configured to acquire images of a surrounding environment of the electronic device, and acquire a value indicating a movement of subject of the images as the value indicating the movement of the electronic device.

According to various embodiments, the controller may be configured to acquire images of a surrounding environment of the electronic device, select a fixed thing among subjects within the images, and acquire a value indicating the movement of the fixed thing within the images as the value indicating the movement of the electronic device.

According to various embodiments, the controller may be configured to acquire the value indicating the movement of the electronic device by using a motion sensor of the electronic device.

According to various embodiments, the controller may be configured to acquire acceleration values with respect to a plurality of axes by using an acceleration sensor of the electronic device, compare each of the acceleration values with respect to the plurality of axes with a predetermined threshold value, and when at least one of the acceleration values is a value equal to or greater than the predetermined threshold value, determine that the electronic device is not in a stationary state.

According to various embodiments, the controller may be configured to compare the value indicating the movement of the electronic device with a predetermined threshold value, and when the value indicating the movement of the electronic device is equal to or smaller than the predetermined threshold value, determine that the electronic device is in a stationary state.

According to various embodiments, the controller is configured to compare values indicating the movement of the electronic device for a predetermined time with a predetermined threshold value, and when the values indicating the movement of the electronic device during the predetermined time are equal to or smaller than the predetermined threshold value, determine that the electronic device is in a stationary state.

According to various embodiments, when the electronic device is not in a stationary state, the controller may be configured to repeat the monitoring and the determining of whether the electronic device is in a stationary state.

According to various embodiments, the controller may be configured to acquire an image of a surrounding environment of the electronic device photographed through the camera of the electronic device, and acquire information on subjects within the image as the surrounding situation information.

According to various embodiments, the controller may be configured to acquire an image of a surrounding environment of the electronic device photographed through the camera of the electronic device, and acquire information on composition of subjects within the image and a name of each subject, as the surrounding situation information.

According to various embodiments, the controller may be configured to acquire an image of a surrounding environment of the electronic device photographed through the camera of the electronic device, and acquire information on composition of subjects within the image and a name of each subject, as the surrounding situation information.

According to various embodiments, the controller may be configured to acquire images of a surrounding environment of the electronic device photographed through the camera, calculate values representing the sharpness or blur on the images, select some of the images based on the sharpness or blur, and acquire information on subjects within the selected images, as the surrounding situation information.

According to various embodiments, the controller may be configured to acquire images of a surrounding environment of the electronic device photographed through the camera of the electronic device, calculate values indicating a relative sharpness or blur with respect to remaining images other than a reference image selected among the images by comparing the images with the reference image, select some of the remaining images based on the values indicating the relative sharpness or the blur, and acquire information on subjects within the selected images as the surrounding situation information.

According to various embodiments, the controller may be configured to acquire images of a surrounding environment of the electronic device photographed through the camera of the electronic device, determine a category of a full-scene of the image, for each of the images, based on the composition of the subjects within the image, and acquire information on a category having at least one duplicate among the categories determined for the images as the surrounding situation information.

According to various embodiments, the controller may be configured to acquire images of a surrounding environment of the electronic device photographed through the camera of the electronic device, determine a category of a full-scene of the image, for each of the images, based on the composition of the subjects within the image, arrange categories determined for the images according to the number of duplications, and acquire information on a category having a predetermined rank or higher among the arranged categories, as the surrounding situation information.

According to various embodiments, the controller may be configured to acquire images of a surrounding environment of the electronic device photographed through the camera, recognize subjects within the images, for each of the images, and acquire information on at least one subject which is duplicated at least once, among the subjects within the images, as the surrounding situation information.

According to various embodiments, the controller may be configured to acquire images of a surrounding environment of the electronic device photographed through the camera of the electronic device, recognize subjects within the images, for each of the images, arrange names of subjects within the images according to the number of duplications, and acquire information on a name having a predetermined rank or higher among the arranged names of the subjects, as the surrounding situation information.

According to various embodiments, the controller may be configured to output, as a voice, the surrounding situation information using the input/output unit of the electronic device.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "unit (e.g., module)" used in various embodiments of the present disclosure may refer to, for example, a "unit" including one of hardware, software, and firmware, or a combination of two or more of the hardware, software, and firmware. The "unit" may be interchangeably used with, for example, the term "unit", "logic", "logical block", "component", or "circuit". The "module" may be the smallest unit of an integrated component or a part thereof. The "unit" may be the smallest unit that performs one or more functions or a part thereof. The "unit" may be mechanically or electronically implemented. For example, the "unit" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (e.g., modules or functions thereof) or methods (e.g., operations) according to the various embodiments of the present disclosure may be implemented as, for example, instructions stored computer readable storage media in the form of programming modules. When the command is executed by one or more processors (for example, the processor 120), the one or more processors may execute a function corresponding to the command. The computer-readable storage medium may be, for example, the memory 130. At least some of the programming modules may be implemented (for example, executed) by, for example, the processor 120. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, there is provided a storage medium storing instructions in which the instructions for performing at least one operation by at least one processor are configured, the at least one operation comprising: monitoring a value indicating a movement of the electronic device; determining whether the electronic device is in a stationary state based on the value indicating the movement of the electronic device; when the state of the electronic device is the stationary state, acquiring information on the surrounding situation information of the electronic device to be notified of to a user; and outputting the surrounding situation information.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

What is claimed is:

1. A method of notifying surrounding situation information by an electronic device, the method comprising:
   displaying an item for executing an application for notifying of surrounding situation information, and in response to selection of the item, executing the application for notifying of surrounding situation information;
   in response to execution of the application for notifying of surrounding situation information, monitoring a value indicating a movement of the electronic device based on images of a surrounding environment of the electronic device photographed through a camera of the electronic device;
   determining whether the electronic device is in a stationary state based on the value indicating the movement of the electronic device;
   in response to determining the stationary state of the electronic device,
      acquiring an image of the surrounding environment of the electronic device photographed through the camera of the electronic device, and
      acquiring information on one or more subjects within the image as the surrounding situation information; and
   outputting the images photographed through the camera and the surrounding situation information.

2. The method of claim 1, wherein the monitoring of the value indicating the movement of the electronic device comprises:
   acquiring a value indicating a movement of a subject within the images as the value indicating the movement of the electronic device.

3. The method of claim 1, wherein the determining of whether the electronic device is in the stationary state comprises:
   comparing values indicating the movement of the electronic device with a predetermined threshold value, for a predetermined time; and
   based on the values indicating the movement of the electronic device, for the predetermined time, as being equal to or smaller than the predetermined threshold value, determining that the state of the electronic device is a stationary state.

4. The method of claim 1, wherein the acquiring of the surrounding situation information of the electronic device comprises:
   acquiring information on a composition of subjects within the image and a name of each of the subjects as the surrounding situation information.

5. The method of claim 1, wherein the acquiring of the surrounding situation information of the electronic device comprises:
   calculating values indicating a relative sharpness or blur with respect to remaining images other than a reference image selected among the images by comparing the remaining images with the reference image;
   selecting some of the remaining images based on the values indicating the relative sharpness or the blur; and
   acquiring information on subjects within the selected images as the surrounding situation information.

6. The method of claim 1, wherein the acquiring of the surrounding situation information of the electronic device comprises:
   determining categories of a full-scene of the images, with respect to each of the images, based on a composition of subjects within the images;
   arranging categories determined for the images according to a number of duplications; and
   acquiring information on a category having a predetermined rank or higher among the arranged categories as the surrounding situation information.

7. The method of claim 1, wherein the acquiring of the surrounding situation information of the electronic device comprises:
   recognizing subjects within the images with respect to each of the images;
   arranging names of subjects within the images according to a number of duplications; and
   acquiring information on the names having a predetermined rank or higher among the arranged names of the subjects as the surrounding situation information.

8. A non-transitory computer-readable storage medium in which a program for executing a method of notifying surrounding situation information by an electronic device is recorded, the method comprising:
   displaying an item for executing an application for notifying of surrounding situation information, and in response to selection of the item, executing the application for notifying of surrounding situation information;
   in response to execution of the application for notifying of surrounding situation information, monitoring a value indicating a movement of the electronic device based on images of a surrounding environment of the electronic device photographed through a camera of the electronic device;
   determining whether the electronic device is in a stationary state based on the value indicating the movement of the electronic device;
   in response to determining the stationary state of the electronic device,
      acquiring an image of the surrounding environment of the electronic device photographed through the camera of the electronic device, and
      acquiring information on one or more subjects within the image as the surrounding situation information; and
   outputting the images photographed through the camera and the surrounding situation information.

9. An electronic device comprising:
   a camera; and
   at least one processor configured to:
      display an item for executing an application for notifying of surrounding situation information, and in response to selection of the item, execute the application for notifying of surrounding situation information,
      in response to execution of an application for notifying of surrounding situation information, monitor a value indicating a movement of the electronic device based on images of a surrounding environment of the electronic device photographed through a camera,
      determine whether the electronic device is in a stationary state based on the value indicating the movement of the electronic device,
      in response to determining the stationary state of the electronic device, acquire an image of the surrounding environment of the electronic device photographed through the camera and acquire information on subjects within the acquired image as the surrounding situation information, and
      output the images photographed through the camera and the surrounding situation information.

10. The electronic device of claim 9, wherein the at least one processor is further configured to acquire a value indicating the movement of a subject within the images as the value indicating the movement of the electronic device.

11. The electronic device of claim 9, wherein the at least one processor is further configured to:
- compare values indicating the movement of the electronic device for a predetermined time with a predetermined threshold value, and
- based on the values indicating the movement of the electronic device during the predetermined time being equal to or smaller than the predetermined threshold value, determine that the electronic device is in a stationary state.

12. The electronic device of claim 9, wherein the at least one processor is further configured to acquire information on a composition of subjects within the image and names of each of the subjects, as the surrounding situation information.

13. The electronic device of claim 9, wherein the at least one processor is further configured to:
- calculate values indicating a relative sharpness or blur with respect to remaining images other than a reference image selected among the images by comparing the remaining images with the reference image,
- select some of the remaining images based on the values indicating the relative sharpness or the blur, and
- acquire information on subjects within the selected images, as the surrounding situation information.

14. The electronic device of claim 9, wherein the at least one processor is further configured to:
- determine categories of a full-scene of images, with respect to each of the images, based on a composition of subjects within the images,
- arrange categories determined for the images according to a number of duplications, and
- acquire information on categories having a predetermined rank or higher among the arranged categories, as the surrounding situation information.

15. The electronic device of claim 9, wherein the at least one processor is further configured to:
- recognize subjects within the images with respect to each of the images,
- arrange names of the subjects within the images according to a number of duplications, and
- acquire information on names having a predetermined rank or higher among the arranged names of the subjects, as the surrounding situation information.

16. The electronic device of claim 9, wherein the at least one processor is further configured to output, as a voice, the surrounding situation information by using an input/output unit of the electronic device.

* * * * *